United States Patent [19]

Sturgis

[11] Patent Number: 4,462,728
[45] Date of Patent: Jul. 31, 1984

[54] ACCESSORY FOR ELECTRIC DRILL

[76] Inventor: Frank Sturgis, 44 Washington St., Shrewsbury, Mass. 01545

[21] Appl. No.: 442,509

[22] Filed: Nov. 18, 1982

[51] Int. Cl.³ .............................................. B23B 31/06
[52] U.S. Cl. ............................ 408/241 R; 16/114 R; 81/90 A; 279/1 K
[58] Field of Search ...................... 279/1 K, 1 H, 62; 81/90 A; 408/241 R; 16/114 R, DIG. 24, DIG. 40

[56] References Cited

U.S. PATENT DOCUMENTS

| | | | |
|---|---|---|---|
| 1,821,436 | 9/1931 | Holloway | 279/1 K |
| 3,947,924 | 4/1976 | Fox et al. | 279/1 K X |
| 4,032,160 | 6/1977 | Karasa et al. | 279/1 K |
| 4,068,978 | 1/1978 | Brock | 408/241 R |

Primary Examiner—Z. R. Bilinsky
Attorney, Agent, or Firm—Blodgett & Blodgett

[57] ABSTRACT

Elongated handle having a threaded spindle for engagement with a threaded aperture in the side of the body of an electric drill and a gear mounted on the same end of the handle for engagement with the geared chuck used with the drill.

6 Claims, 5 Drawing Figures

ACCESSORY FOR ELECTRIC DRILL

BACKGROUND OF THE INVENTION

In the operation of an electric drill intended to be held in the hand, it is common practice to provide a removable handle extending laterally from one side of the drill housing to assist in holding the drill steadily. The normal drill handle is held in the right hand and the side handle is grasped by the left hand, thus giving a sturdy grasp on the drill. Such drills are commonly provided with a gear-operated chuck which is tightened and loosened on the tool by use of a key. This key involves a small gear held on the end of a T-shaped handle. Unfortunately, such keys are easily mislaid and lost, particularly when the drill is being used at a location that is remote from the workshop. Even when the key is only mislaid, it is difficult to find because of its small size. It has been an occasional practice in the past to attach the key to a lanyard, the other end of which is attached to the drill. However, this arrangement can interfere with the use of the drill and, as a matter of fact, may be dangerous on occasion. These and other difficulties experienced with the prior art devices have been obviated in a novel manner by the present invention.

It is, therefore, an outstanding object of the invention to provide an accessory for an electric drill which combines a supporting handle with a chuck-operating key.

Another object of this invention is the provision of an electric drill device combining the chuck key with another accessory used with the drill.

A further object of the present invention is the provision of an electric drill accessory combining a side handle and a chuck key, in such a way that the chuck key is not easily lost or mislaid.

It is another object of the instant invention to provide an electric drill accessory, combining the features of a removable side handle with a chuck key.

A still further object of the invention is the provision of an electric drill accessory which is simple in construction, which is inexpensive to manufacture, and which is capable of a long life of useful service with a minimum of maintenance.

It is a further object of the invention to provide an electric drill accessory that permits a chuck key to be operated easily, because of a large torque available without strain to the operator.

With these and other objects in view, as will be apparent to those skilled in the art, the invention resides in the combination of parts set forth in the specification and covered by the claims appended hereto.

SUMMARY OF THE INVENTION

In general, the invention consists of an accessory for an electric drill, wherein the accessory consists of an elongated handle, that has a threaded spindle extending from one end for removable engagement with a threaded aperture in the side of the body of the drill. A gear is mounted on the same end of the handle for engagement with a geared chuck mounted on the drill, the spindle extending axially a substantial distance beyond the gear.

Most specifically, the diameters of the threaded aperture in the drill body and of the lateral body of the chuck are the same, so that the spindle fits snugly in both of them. The handle, the threaded spindle, and the gear are all locked together tightly.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
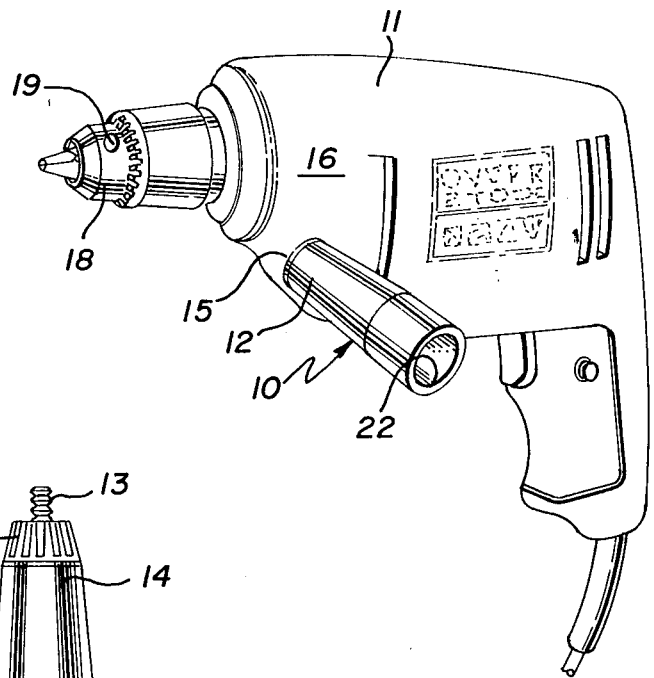
FIG. 1 is a perspective view showing the accessory of the invention in use with an electric drill.

Referring first to FIG. 1, wherein are best shown the general features of the invention, the accessory 10 is shown in use with an electric hand drill 11. The accessory has an elongated handle 12 for removable engagement with a threaded aperture 15 in the side of the body 16 of the drill. The drill is also provided with a geared chuck 18, having a lateral bore 19. A counterbore 22 is shown entering the outer end of the handle 12.

Figure 2:
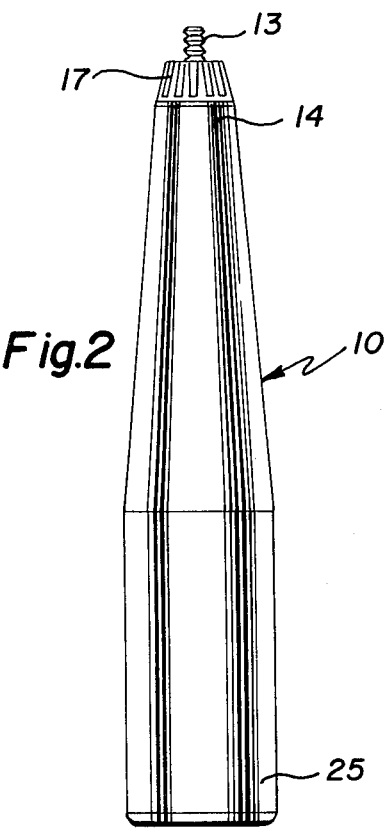
FIG. 2 is a front elevational view of the accessory.
Figure 3:
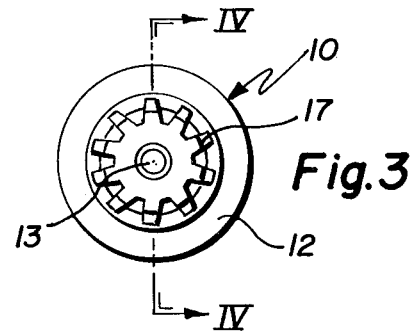
FIG. 3 is a top plan view of the accessory.
Figure 5:
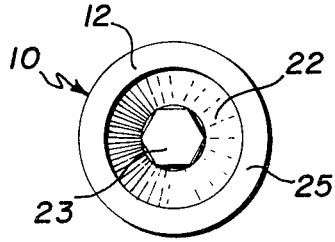
FIG. 5 is a bottom plan view of the accessory.

Referring to FIGS. 2, 3, and 5, wich show the details of the invention, it can be seen that a threaded spindle 13 extends from one end 14 of the handle 12 for threaded engagement with the aperture 15 in the side of the body of the electric drill. A gear 17 is mounted on the same end 14 of the handle for engagement with the geared chuck 18 that is mounted on the drill. The spindle 13 extends axially a substantial distance beyond the gear 17.

Figure 4:
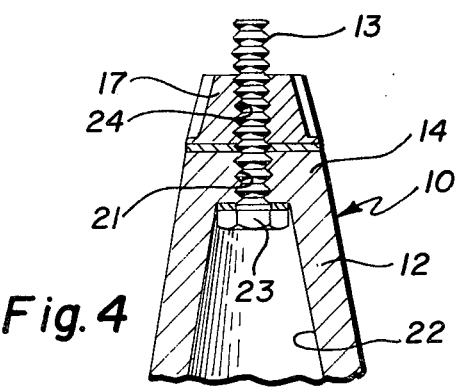
FIG. 4 is a vertical sectional view of the accessory taken on the line IV—IV of FIG. 3.

FIG. 4 shows further details of construction of the device. More particularly, it can be seen that the gear 17 has a frusto-conical shape and is concentric with the threaded spindle 13. The threaded aperture 15 in the body of the drill is selected so that, not only does the threaded spindle 13 engage it to hold the handle 12 rigidly relative to the electric drill, but the threaded spindle also fits snugly in the unthreaded lateral bore 19 of the chuck. In other words, the diameters of the threaded aperture of the drill in the drill body and of the unthreaded lateral bore of the chuck are the same, so that the spindle fits snugly in both of them.

As is evident in FIG. 2, the handle 12 is of elongated, generally frusto-conical shape. The handle has a threaded bore 21 in the end 14 to receive the threaded spindle 13. A large counterbore 22 enters the other end 25 of the handle for most of its length. The threaded spindle 13 has a non-circular head 23 that lies in the bottom of the counterbore and is locked therein. The handle 12, the threaded spindle 13, and the gear 17 are all locked together tightly, because of a threaded bore 24 in the gear 17 that threads over the spindle 13, so that the spindle 13 with its head 23 and the gear 17 with its thread bore 24 act as a bolt and nut to hold the elements together. They are also locked together by use of a suitable cement, so that considerable torque can be applied with a separation of the elements.

The operation and the advantages of the present invention will now be readily understood in view of the above description. The accessory 10 can be applied to the side 16 of the electric drill 11 by threading the threaded spindle 13 into the threaded aperture 15 in its side. When pulled up tightly, the handle provides a second method of grasping the drill, so that the drill can be held with two hands and controlled readily.

When it is necessary to tighten or loosen the chuck 18, the accessory (after removal from the threaded aperture 15) can be operated by introducing the spindle 13 into the lateral bore 19 in the chuck and causing the gear 17 to engage the conventional gear on the chuck. Because of the length of the handle 12 and the selection of high friction material, it is possible to grasp the handle and apply considerable torque to the chuck very readily for loosening or tightening it.

It can be seen, then, that the present accessory combines the two elements of a side handle and a chuck key into a single useful element in which the handle makes it possible to apply considerable torque to the key without difficulty. At the same time, it is difficult to lose the key because it forms part of a large handle which is easy to see and is not easily mislaid or lost.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Accessory for electric drill, comprising:
   (a) an elongated handle,
   (b) a threaded spindle extending from one end of the handle for removable engagement with a threaded aperture in the side of the body of the drill, and
   (c) a gear mounted on the end of the handle for engagement with a geared chuck mounted on the drill, the spindle extending axially a substantial distance beyond the gear.

2. Accessory as recited in claim 1, wherein the gear has a frusto-conical shape and is concentric with the threaded spindle.

3. Accessory as recited in claim 1, wherein the threaded aperture in the body of the drill is selected so that not only does the threaded spindle engage it to hold the handle rigidly, but the threaded spindle also fits snugly in the lateral bore of the chuck.

4. Accessory as recited in claim 1, wherein the diameters of the threaded aperture in the drill body and the lateral bore of the chuck are the same, so that the spindle fits snugly in both of them.

5. Accessory as recited in claim 1, wherein the handle is of elongated, generally frusto-conical shape, wherein the handle has a threaded bore in the said one end to receive the threaded spindle, wherein a large counterbore enters the other end of the handle for most of its length, and wherein the threaded spindle has a non-circular head that lies in the bottom of the counterbore and is locked therein.

6. Accessory as recited in claim 5, wherein the handle, the threaded spindle, and the gear are all locked together tightly.

* * * * *